United States Patent Office 3,553,266
Patented Jan. 5, 1971

3,553,266
DIARALKYLAMINE DERIVATIVES
William F. Bruce, Havertown, Pa., assignor to American Home Products Corporation, New York, N.Y., a corporation of Delaware
No Drawing. Continuation-in-part of application Ser. No. 502,370, Oct. 22, 1965. This application Aug. 8, 1968, Ser. No. 751,029
Int. Cl. C07c 91/22
U.S. Cl. 260—570.6
4 Claims

ABSTRACT OF THE DISCLOSURE

Diaralkylamines are prepared by prolonged reaction of styrene oxide with selected hydroxyaralkylamines having alicyclic substituents of 3, 5 and 7 carbon atoms. The compounds have been found to be pharmacodynamically active and useful for bronchodilator effects.

---

This case is a continuation-in-part application stemming from application, Ser. No. 502,370, filed Oct. 22, 1965 and now abandoned.

The invention relates to diaralkylamine derivatives and the method for producing them. More particularly, the invention involves certain tertiary hydroxyaralkylamines having useful pharmacological activity.

The compounds of the invention are those which may be represented by the general formula:

where R represents either an alicyclic group of 3, 5 or 7 carbon atoms while the radicals $R^1$ and $R^2$ are hydroxyaralkyls. Of particular interest are those compounds where $R^1$ and $R^2$ both represent a beta-hydroxy-beta-phenylethyl radical.

The compounds falling within the scope of the invention have been found to possess central nervous system depressant activity when tested pharmacologically under experimental and scientifically acceptable pharmacological procedures in mice, and in further experimental procedures essentially along the lines described in prior publications, the compounds of the invention showed significant bronchodilator activity in guinea pigs.

The tertiary amines of the invention are prepared by reacting styrene oxide with a selected amine of the formula $RNH_2$, wherein R has the significance as previously indicated. The reaction is carried out in an alcoholic solvent, preferably ethanol, at about steam bath temperature for a period up to about 3 hours and then the reaction mixture is held for a substantial period of time at room temperature, preferably for 10 to 20 days.

The following examples are intended primarily as illustrative of the best mode contemplated for carrying out the invention. It is to be understood that the quantities and temperatures are in the metric system.

EXAMPLE 1

α,α'-[(Cyclopropylimino)dimethylene]dibenzyl alcohol

To 10 g. of cyclopropylamine in 40 cc. of ethanol was added 25 g. of styrene oxide in three portions. The solution was warmed on a steam bath for 15 minutes, when a mild exotherm was noted and the flask was let stand at room temperature for three weeks. The solution was then concentrated in vacuo and distilled to give 10 g. of colorless oil boiling at 129–30° at 0.5 mm.

Distilling the residue from product obtained as described, 10 g. of a pale yellow very viscous oil was obtained boiling at 204–6° at 0.5 mm. the structure of which was found to be the named compound by analysis and examination of the infrared absorption spectrum.

Analysis.—Calcd. for $C_{19}H_{23}NO_2$ (percent): C, 76.73; H, 7.80; N, 4.71. Found (percent): C, 76.54; H, 7.81; N, 4.97.

This compound, when tested pharmacologically showed bronchodilator activity in guinea pigs at a dose of 25 mg./kg., i.p. Central nervous system depressant action was found at 127 mg./kg. in mice, given orally.

EXAMPLE 2

α,α'-[(Cyclopentylimino)dimethylene]dibenzyl alcohol

To 17 g. of cyclopentylamine in 25 cc. of ethanol was added 25 g. of styrene oxide. The solution was warmed on a steam bath for two hours and then let stand at room temperature for three weeks. It was then concentrated in vacuo and distilled to give 20 g. of colorless oil boiling at 135–7° at 0.5 mm.

By distilling the residue from the product obtained, five grams of a very viscous yellow oil was obtained, boiling, at 235–7° at 0.5 mm. Identification of the compound was made from its analysis and infra-red spectrum.

Analysis.—Calcd. for $C_{21}H_{27}NO_2$ (percent): C, 77.50; H, 8.38; N, 4.30. Found (percent): C, 77.43; H, 8.48; N, 4.49.

In the pharmacological evaluation experiments, carried out by standard procedures, the compound showed bronchodilator action in guinea pigs when injected intraperitoneally with a single dose of 25 mg./kg. The central nervous system depressant action was found by administering the compound orally to mice with a single dose in the range of 12.7 to 40 mg./kg.

EXAMPLE 3

α,α'-[(Cycloheptylimino)dimethylene]dibenzyl alcohol

By adding 25 g. of styrene oxide to 24 g. of cycloheptyl amine in 35 g. of ethanol, heating the yellow solution on a steam bath for two hours, and letting it stand at room temperature for three weeks, about two grams of the product crystallized in long needles. By addition of an equal volume of ether and cooling the solution to −10°, nine grams more of the solid melting at 79–80° was secured. By concentrating and distilling the filtrate from this solid, seven more grams was obtained.

By distilling the residues obtained seven grams of a very viscous clear yellow oil resulted, boiling at 255–60° at 0.3 mm. From its analysis and infra-red spectrum it was shown to be the title compound.

Analysis.—Calcd. for $C_{23}H_{31}NO_2$ (percent): C, 78.14; H, 8.84; N, 3.96. Found (percent): C, 78.11; H, 8.94; N, 4.00.

In the experimental pharmacological procedures carried out as previously indicated, the compound also showed bronchodilator activity in guinea pigs when administered in the test procedure intraperitoneally at a single dose of 25 mg./kg. In the pharmacological evaluation for central nervous system activity, this compound showed CNS depressant action with single oral doses in the range of 40 to 127 mg./kg.

The compounds of the invention may be utilized either as the free base or in the form of nontoxic or pharmaceutically acceptance, acid-addition salts. The latter are prepared from organic or inorganic acids by reacting the bases with the selected acid substance in well-known manner, one method being exemplified above. Examples of acids which may be used, in addition to that already disclosed, are sulfuric, phosphoric, hydrobromic, acetic, fumaric, maleic, tartaric, or the like.

To prepare the compounds in dosage forms, they may be combined with various solid or liquid extenders, carriers or excipients, depending on whether they are to be used orally or parenterally. Oral forms may be prepared in the form of tablets, capsules or liquid suspensions. For parenteral applications, compositions may be prepared in an aqueous or oleaginous vehicle.

The invention claimed is:

1. A compound having the formula:

in which R is an alicylic selected from the group consisting of cyclopropyl, cyclopentyl, and cycloheptyl, while $R^1$ and $R^2$ are each β-hydroxy-β-phenethyl.

2. A compound of claim 1; α,α'-[(cyclopropylimino)dimethylene]dibenzyl alcohol.

3. A compound of claim 1; α,α'-[(cyclopentylimino)dimethylene]dibenzyl alcohol.

4. A compound of claim 1; α,α'-[(cycloheptylimino)dimethylene]dibenzyl alcohol.

OTHER REFERENCES

Matveev et al., "Jh. Obshch. Khim.," vol. 32, pp. 574–6 (1962).

ROBERT V. HINES, Primary Examiner

U.S. Cl. X.R.

260—501.18; 424—330